July 14, 1942.  E. C. HORTON ET AL  2,289,545
WINDSHIELD WIPER
Filed April 6, 1940
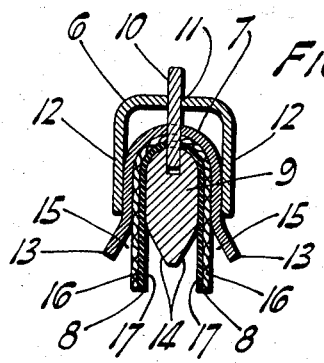
FIG. 2.
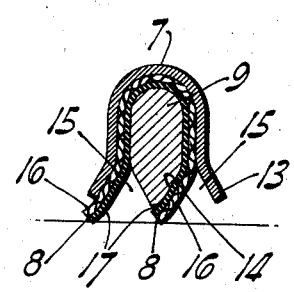
FIG. 3.
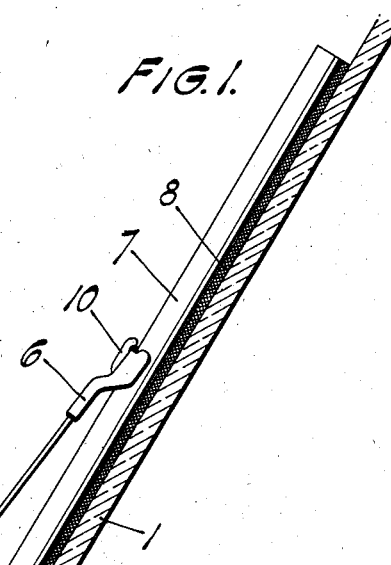
FIG. 1.
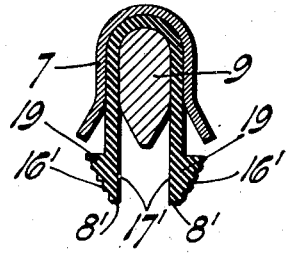
FIG. 4.
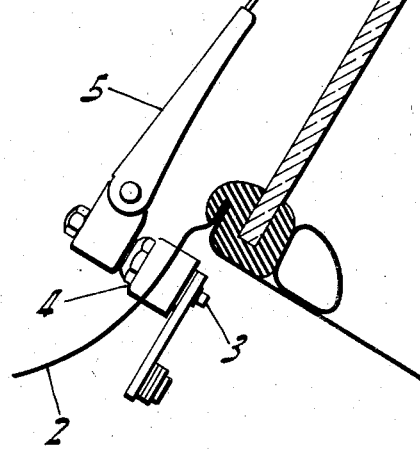
INVENTORS
ERWIN C. HORTON &
ANTHONY C. SCINTA
BY
Beau, Brooks, Buckley & Beau.
ATTORNEYS Patented July 14, 1942

2,289,545

UNITED STATES PATENT OFFICE 2,289,545

WINDSHIELD WIPER

Erwin C. Horton, Hamburg, and Anthony C. Scinta, Buffalo, N. Y., assignors to Trico Products Corporation, Buffalo, N. Y.

Application April 6, 1940, Serial No. 328,271

2 Claims. (Cl. 15—245)

This invention relates to a windshield cleaner and more particularly to the wiping blade or element thereof. More particularly the invention relates to that type of blade in which a scarifying or scrubbing element is provided for assisting in the removal of vision obscuring matter which has accumulated on the windshield in the field of vision, such as insects, ice, and the like.

The primary object of the invention is to provide a wiper which will be efficient in operation and effective in cleaning the glass of matter tending to obscure the vision therethrough. More particularly the invention resides in a wiper having means for initially scrubbing or loosening foreign matter on the glass, and other means functioning in successive order to lap or wipe the glass free of the loosened matter so as to leave the field of vision clear.

In the drawing

Fig. 1 is a fragmentary sectional view through a windshield depicting a wiper of the preferred form operatively related thereto;

Fig. 2 is a transverse sectional view through the wiper and its actuating arm;

Fig. 3 is a cross sectional view illustrating the wiper in action; and

Fig. 4 is a cross sectional view through a modified embodiment of the invention.

Referring more particularly to the accompanying drawing, numeral 1 designates the windshield glass and 2 the cowl structure at the base thereof in which is mounted the wiper actuating shaft 3 by means of the bearing support 4. Fixed on the outer end of the actuating shaft is the usual spring arm 5 which has its outer end urged under spring pressure toward the glass and is equipped with a fitting 6 for attachment to the wiper blade. The blade comprises a channeled holder 7, a pair of wiping elements 8 and a core member 9, an attaching fin 10 being suitably anchored in the holder 7 for detachable engagement in a slot 11 of the fitting 6. This arm terminal fitting has spaced ears 12 straddling the back of the holder in snug embrace so as to hold the wiping blade against any substantial rocking movement on the glass.

The marginal portions 13 of the holder flare outwardly while the free marginal edge of the core 9 between these flaring margins 13 is tapering on its opposite sides as at 14 to form with such flaring margins a pair of substantially V-shaped, parallel channels 15 from which extend the wiping elements 8. These wiping elements are provided on their remote faces 16 with a roughened surface so as to afford a scrubbing or scarifying action when moved over the glass. The opposed inner faces 17 are relatively smooth and are designed for lapping or wiping the scrubbed surface and imparting thereto a smooth finish free of all loosened vision obscuring matter. Under the urge of the spring tension of the arm 5, the wiping edges of the elements 8 are brought firmly into wiping contact with the glass and by reason of the relative arrangement of the scarifying and lapping edges 16 and 17, respectively, the advancing one of the wiping elements will always tend to break up or loosen the vision obscuring matter followed by the lapping action of the succeeeding wiping element which will tend to wipe off the loosened matter and polish the glass surface or at least spread the remaining moisture in a uniform film across the field of vision. This cooperative arrangement is depicted in the cross sectional showing of Fig. 3 from which it will be observed that the defining walls of the parallel channels 15 determine the extent of flexing of the wiping elements and serve to reinforcingly back them so as to effect the desired pressure in their wiping contact on the glass. The wiping elements may be suitably clamped within the holder, as by the nesting core member 9, and may comprise a single strip of stock engaged along its longitudinal center by and upon placement of the core within the holder.

The wiping elements may be of laminated formation in which one lamina consists of a coarse woven fabric or wire mesh to provide the roughened surface 16 and a backing layer of rubber which is firmly bonded thereto by being pressed into intimate contact therewith to cause the rubber to enter the interstices of the woven fabric. In lieu of the woven fabric the outer faces of the wiping elements may be roughened, as shown at 16' in Fig. 4. In this modified embodiment the wiping elements 8' may be formed of solid rubber material and molded with marginal enlargements 19, the outer surfaecs of which are roughened as stated.

In both forms of the invention the relative arrangement of the scarifying and lapping faces is maintained so that in operation the vision obscuring matter will first be broken up and loosened by the initially roughened faces (16, 16') and finally be wiped clear of the windshield glass by the following lapping action of the smooth faces (17, 17'). Since the wiping blade is held upright without any substantial rocking movement at the beginning of each stroke, the cooperation of the two faces is more pronounced because the extent to which the wiping elements project from the rigid holder 7 is kept at a minimum to make them less flexible. The relatively short wiping elements engaging beneath the free edges of the core and holder exert a steady pressure and provide a firm wiping contact.

While the foregoing description has been given in detail, it is obvious that the inventive principles herein involved are applicable to other physical embodiments without departing from the spirit or scope of the invention as claimed.

What is claimed is:

1. A wiping blade for windshield cleaners comprising a channeled holder having its marginal portions flaring outwardly, a core member within the channel of the holder having outwardly converging faces defining with said marginal portions a pair of channels of substantially V-shaped cross section, a pair of flexible wiping elements secured in the holder by the core member and having wiping edge portions projecting outwardly from the pair of channels, the wiping edge portions being provided on their remote sides with roughened surfaces and on their opposed inner sides with relatively smooth surfaces, the converging faces extending outwardly beyond said marginal portions whereby the core member will support the roughened surfaces closer to the windshield surface than the marginal portions support the smooth surfaces.

2. A wiping blade for windshield cleaners comprising a holder and a flexible wiping element, said element having a scarifying face on one side and a smooth lapping face on the other side, said holder having element-embracing sides with one side extending beyond the opposite side to provide support for the scarifying face closer to the windshield surface than the support given by said opposite side to the lapping face when the respective faces are flexed into operative contact with the windshield.

ERWIN C. HORTON.
ANTHONY C. SCINTA.